United States Patent [19]

Parker et al.

[11] Patent Number: 5,707,151
[45] Date of Patent: Jan. 13, 1998

[54] TEMPERATURE TRANSDUCER ASSEMBLY

[75] Inventors: Thomas W. Parker, Columbus; Charles D. Grant, Powell, both of Ohio

[73] Assignee: Ranco Incorporated of Delaware, Wilmington, Del.

[21] Appl. No.: 273,588

[22] Filed: Jul. 11, 1994

Related U.S. Application Data

[63] Continuation-in-part of Ser. No. 180,671, Jan. 13, 1994, Pat. No. 5,454,641.

[51] Int. Cl.$^6$ .................. G01K 1/14; G01K 1/16; G01K 13/00
[52] U.S. Cl. .................. 374/120; 374/147; 374/208; 236/DIG. 6
[58] Field of Search .................. 374/120, 147, 374/208; 236/DIG. 6; 165/11.1

[56] References Cited

U.S. PATENT DOCUMENTS

| | | | |
|---|---|---|---|
| 2,484,585 | 10/1949 | Quinn . | |
| 2,979,586 | 4/1961 | Siri | 236/DIG. 6 |
| 3,123,790 | 3/1964 | Tyler . | |
| 3,151,484 | 10/1964 | Feehan et al. | 374/147 |
| 3,357,249 | 12/1967 | Bernous et al. . | |
| 3,511,091 | 5/1970 | Thome | 374/147 |
| 3,789,340 | 1/1974 | Adams . | |
| 3,981,266 | 9/1976 | Persson | 374/147 |
| 4,303,827 | 12/1981 | Kyles | 236/DIG. 6 |
| 4,411,537 | 10/1983 | Grimm | 374/185 |
| 4,527,908 | 7/1985 | Arisi | 374/147 |
| 4,529,869 | 7/1985 | Ekstrom, Jr. | 374/180 |
| 4,575,258 | 3/1986 | Wall | 374/147 |
| 4,614,443 | 9/1986 | Harnett | 374/208 |
| 4,770,545 | 9/1988 | Takada et al. | 374/208 |
| 4,881,057 | 11/1989 | Garcia et al. . | |
| 4,882,908 | 11/1989 | White . | |
| 5,172,979 | 12/1992 | Barkley et al. | 374/147 |
| 5,281,793 | 1/1994 | Gavin et al. | 374/208 |
| 5,382,093 | 1/1995 | Dutcher | 374/147 |
| 5,454,641 | 10/1995 | Parker et al. | 374/147 |

FOREIGN PATENT DOCUMENTS

| | | | |
|---|---|---|---|
| 2252566 | 6/1975 | France | 374/147 |
| 2638522 | 5/1990 | France | 374/147 |
| 1040351 | 9/1983 | U.S.S.R. | 374/147 |
| 2062860 | 5/1981 | United Kingdom . | |

Primary Examiner—Diego F.F. Gutierrez
Attorney, Agent, or Firm—Watts, Hoffmann, Fisher & Heinke Co., L.P.A.

[57] ABSTRACT

A temperature sensing assembly for a heat exchanger flow tube comprises a housing having a thin heat transmitting wall section in heat conducting engagement with a flow tube, and a relatively thick, heat insulating structural support wall section; a thermally responsive signal producing assembly comprising an electrical signal producing element in heat transfer relationship with the heat transmitting wall section; a heat transfer element between the housing and heat exchanger flow tube tending to maintain the flow tube and heat insulating wall section temperatures the same; and an insulating jacket surrounding part of the heat transfer element.

9 Claims, 3 Drawing Sheets

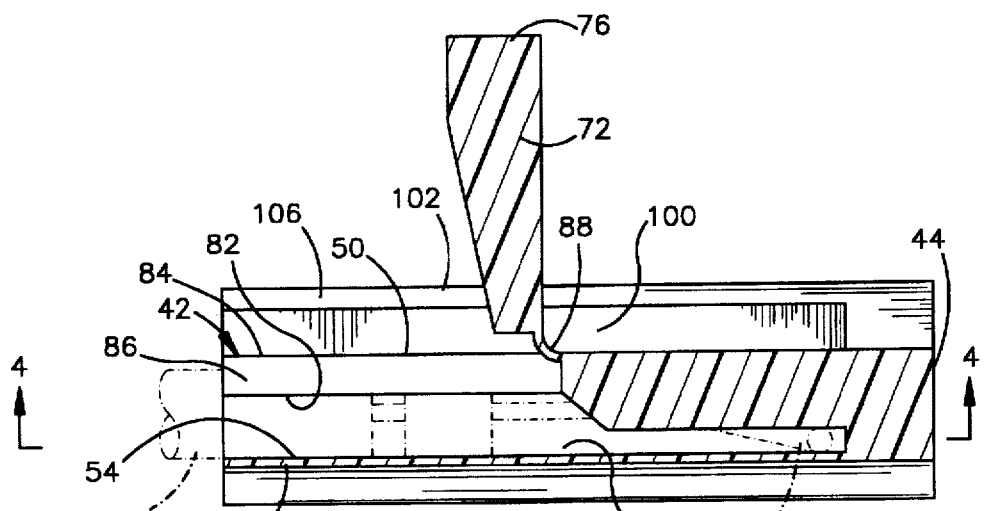
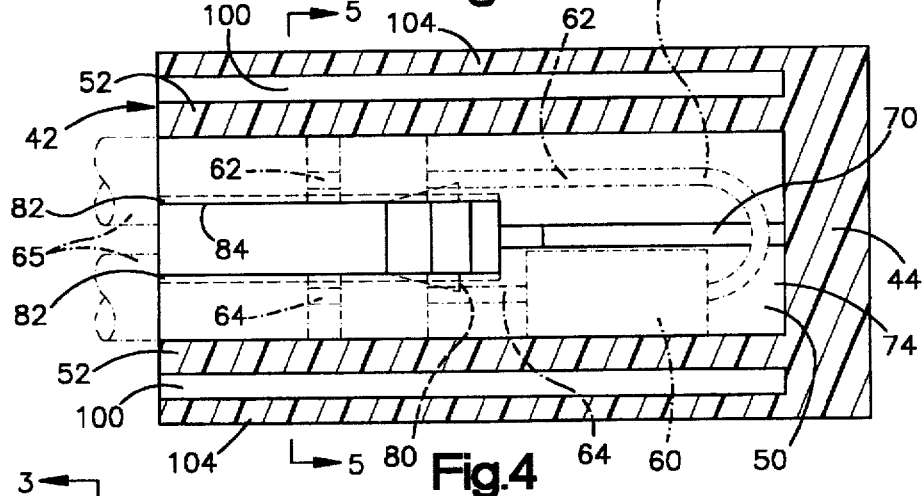
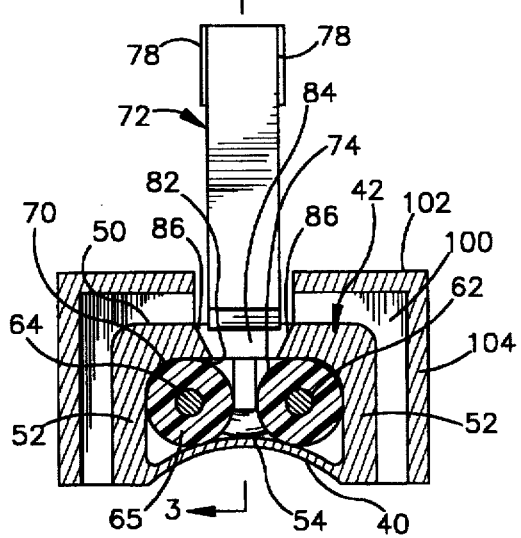
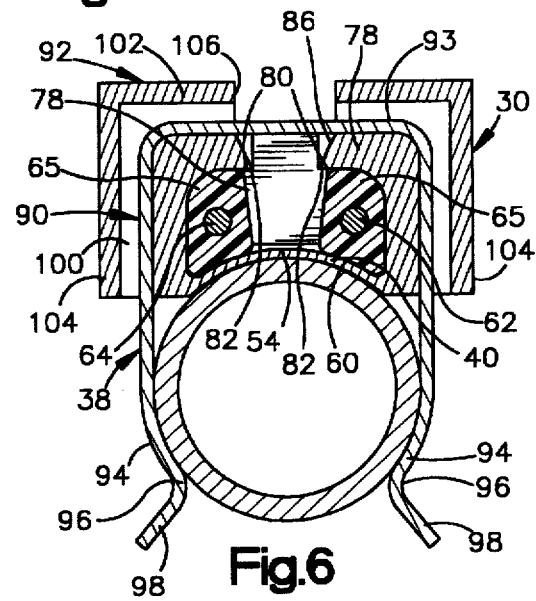

TEMPERATURE TRANSDUCER ASSEMBLY

CROSS-REFERENCE TO RELATED APPLICATION

This is a continuation in part of application Ser. No. 08/180,671 filed on Jan. 13, 1994, now U.S. Pat. No. 5,454,641.

FIELD OF THE INVENTION

The present invention relates to a temperature sensing assembly and more particularly to a temperature sensing assembly for monitoring the temperature of an object in an ambient fluid having a temperature which is different from that of the object.

Temperature sensing assemblies for monitoring the temperature of an object in an ambient fluid having a different temperature are used in many different applications. An example is a "heat pump" refrigeration system used for heating and cooling buildings. During cold weather, when a heat pump is used to heat a building, refrigerant is passed through an outdoor heat exchanger where it is evaporated and gathers heat from outdoor air. The refrigerant is then compressed and passed through an indoor heat exchanger where the heat is transferred from the refrigerant to indoor air for heating the building.

The outdoor heat exchanger typically includes a highly conductive metal flow tube through which the refrigerant flows for efficient heat exchange between the tube and its environment (usually atmospheric air). Atmospheric air is blown across the heat exchanger to maximize convective heat transfer between the flow tube and the air. When the outdoor air is moist or cold, frost or ice may form on the outdoor heat exchanger flow tubes. The ice or frost insulates the tubes. Thus heat flow into refrigerant in the flow tube from the flowing air is impeded. The impeded heat transfer reduces the heat pump efficiency and requires periodically clearing frost or ice from the outdoor heat exchanger flow tubes.

BACKGROUND ART

So called "demand defrost" heat pump systems are designed to defrost the outdoor heat exchanger flow tubes when ice or frost has actually formed. Numerous different approaches to sensing frost or ice accumulations have been proposed. One general approach is to sense the temperature difference between the atmospheric air and the outdoor flow tubes when the atmospheric air temperature approaches freezing. The insulating effect of frost on the flow tube reduces heat flow to the refrigerant from the ambient air. Consequently, when ice or frost forms the outdoor heat exchanger, flow tube surface temperature drops relative to the ambient air temperature. The existence of a predetermined temperature differential between the flow tube surface and ambient air (at a given temperature) signifies that frost or ice is present and the tube should be defrosted.

As the atmospheric air becomes increasingly colder, the temperature differential indicative of ice or frost on the flow tube becomes progressively smaller. Thus, sensing the tube surface temperature with a high degree of accuracy is essential to effectively operating demand defrost heat pump systems at low outdoor temperatures. Achieving such accuracy is difficult because devices used to sense tube surface temperatures are typically exposed to the ambient air, often with the air flowing over the sensor at considerable velocity. The ambient air transfers heat to the sensor device. This heats the sensor and reduces its ability to accurately signal the flow tube temperature. Defrost cycles are thus forestalled when ice or frost has accumulated and is adversely effecting the system.

Modern demand defrost systems are typically electrically operated and rely on temperature sensors which produce electric signals having values dependant upon sensed flow tube temperature. It is essential that the sensing elements be electrically isolated from the flow tubes. Typical electrical insulators are also effective heat insulators. Electrically isolating the sensors from the flow tubes thus has the effect of diminishing heat transfer between sensor and flow tube. This has reduced defrost system responsiveness.

Temperature sensor devices have been attached to the outdoor tubes in different ways. One technique was to clamp an electrically insulated temperature sensor device directly onto the tube using a hose clamp or spring clip. This assured good thermal contact between the heat exchanger flow tube and the temperature sensor, but placed the sensor in convective heat transfer relationship with the atmospheric air. Inaccurate flow tube temperature readings resulted. To minimize heat gains from the air, heavy insulating tape was sometimes wrapped around the sensor and flow tube. The tape tended to assume the ambient air temperature and adversely influence the sensor output signal.

In still other installations sensors were placed in metal housings clamped to the flow tubes. The housing materials were efficient heat conductors but the sensors had to be electrically insulated from the flow tubes. The sensors were thus stationed in the housings in a body of plastic or other electric insulating material. The electrical insulating materials were likewise thermal insulators. These devices did not produce acceptably accurate flow tube temperature readings.

Temperature sensors and techniques for mounting them in thermal contact with an object are documented in a number of prior art patents. U.S. Pat. No. 2,484,585 to Quinn, U.S. Pat. No. 3,123,790 to Tyler and U.S. Pat. No. 3,357,249 to Bernous, et al. disclose temperature sensors and mounting techniques for the disclosed temperature sensors.

In order to function as required for a demand defrost application the sensors had to be constructed so that they quickly and accurately monitored the flow tube temperature. This required efficient thermal coupling between the sensor and the flow tube. At the same time the sensors had to be unresponsive to ambient air temperature, an attribute of a good heat insulator. Finally, the sensors had to be mounted so that they were electrically insulated and isolated from the heat pump system components. These conflicting requirements were not satisfied in prior art sensor constructions.

The present invention provides a new and improved temperature sensing assembly for sensing the temperature of an object in a fluent medium and producing an electrical output signal, the assembly being so constructed and arranged that the sensor is electrically isolated from the object, effectively thermally coupled to the object and insulated from heat exchange with the fluent medium.

DISCLOSURE OF THE INVENTION

A temperature sensing assembly for determining the temperature of an object in a fluent medium constructed according to preferred embodiments of the invention comprises a thermally responsive signal producing assembly having an electric signal producing element for producing electrical signals whose values depend on the temperature of the signal element, and first and second conductors for completing an electric circuit through the element; an elongated sensor housing supporting the electric signal producing element, the housing constructed from electrically insulative material and comprising a thin heat transmitting wall section in heat transfer engagement with the electrical signal producing element and a body fixing the electric signal producing element in place with respect to the heat transmitting wall section; and, an insulating jacket coextending with the sensor housing and spaced from the housing to define a channel therebetween.

In the preferred embodiments a heat transfer structure is disposed in heat transfer relationship between the housing and the object and tends to maintain the object and the housing temperatures the same.

The heat transfer structure is disposed at least partly in the channel between the housing and the insulating jacket so that the insulating jacket resists heat transfer between the ambient fluent medium and the heat transfer structure.

The preferred and illustrated heat transfer structure comprises a heat conductive spring member which also serves to secure the sensor assembly in heat transfer relationship with the object.

The preferred sensor assemblies employ an anchoring arrangement for securing the signal producing element in heat transfer relationship with the heat transmitting housing wall wherein a positioner member latches into position for maintaining the signal producing element in heat transfer relationship with the heat transmitting wall.

In another preferred embodiment the sensor assembly housing is formed by a core forming the heat transmitting wall section and a body which envelopes the signal producing element Further features and advantages of the invention will become apparent from the following detailed description of a preferred embodiment made with reference to the accompanying drawings which form part of the specification.

BRIEF DESCRIPTION OF THE DRAWINGS

FIG. 3 is a cross sectional view seen approximately from the plane indicated by the line 3—3 of FIG. 5;

FIG. 4 is a cross sectional view seen approximately from the plane indicated by the line 4—4 of FIG. 3;

FIG. 5 is a cross sectional view seen approximately from the plane indicated by the line 5—5 of FIG. 4;

FIG. 6 is a cross sectional view (similar to FIG. 5) of the sensing assembly of FIG. 2 mounted on a flow tube with parts illustrated in alternate positions;

BEST MODE FOR PRACTICING THE INVENTION

Figure 1:
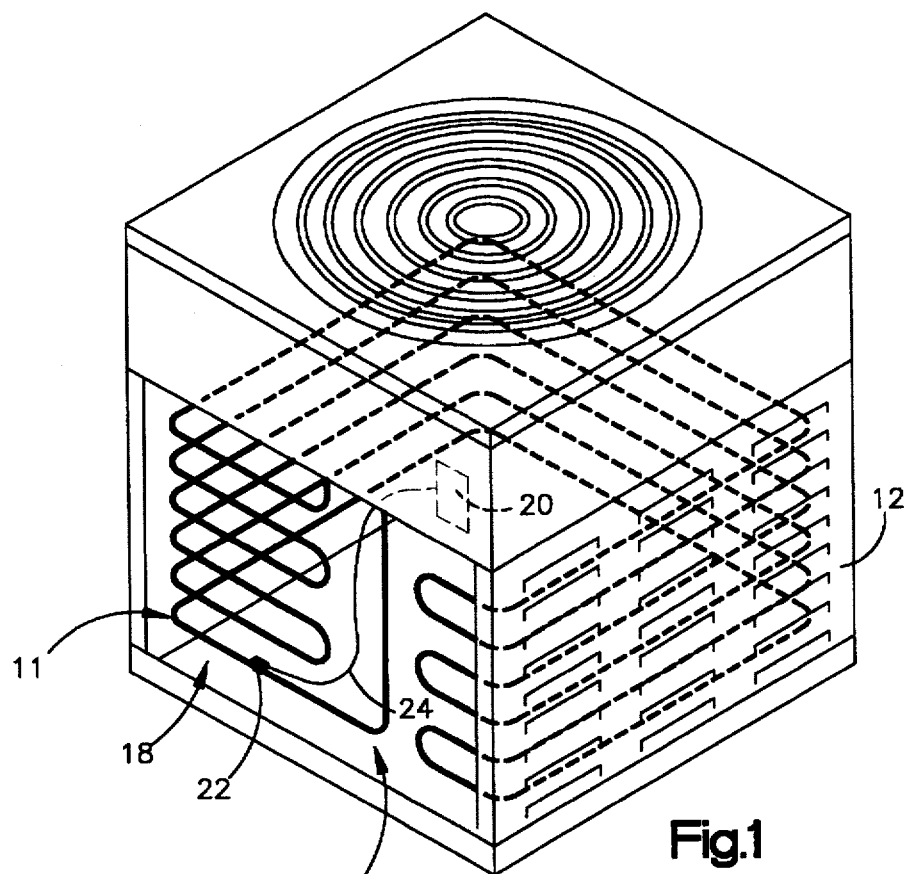
FIG. 1 schematically illustrates an outdoor heat exchanger of a heat pump system used to heat and cool the interior of a building with a refrigerant flow tube temperature sensing assembly and control module attached.
Figure 2:
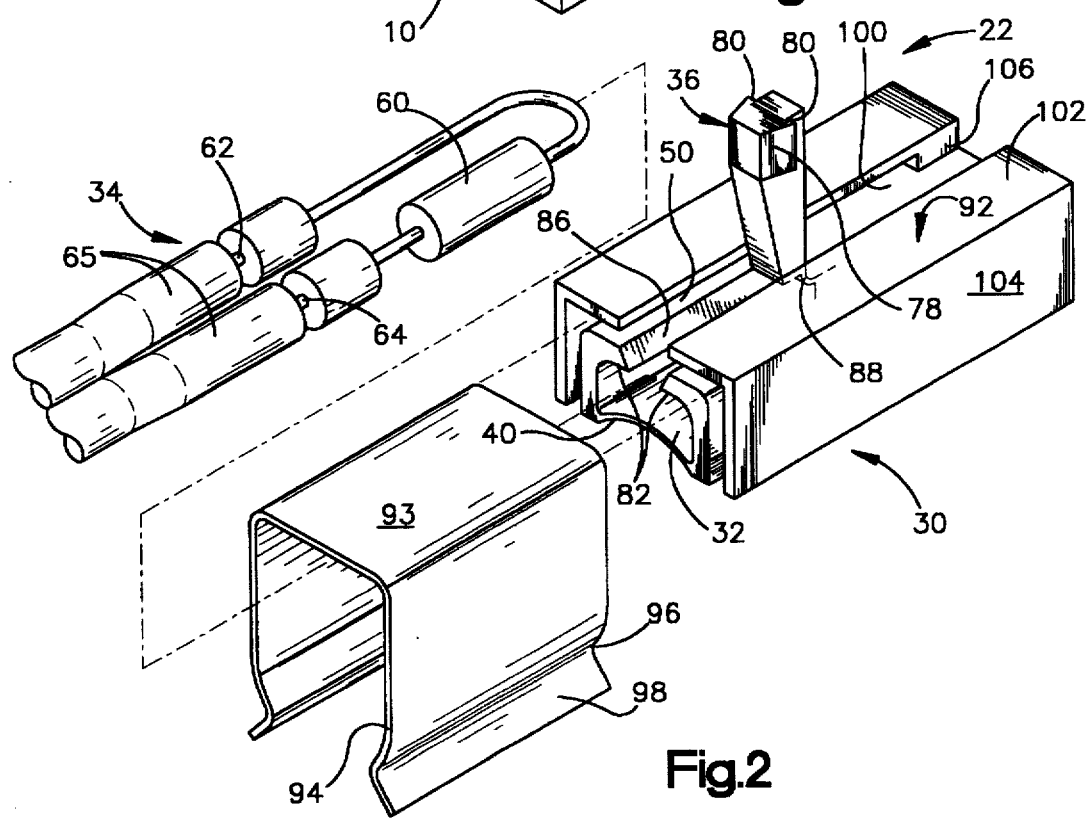
FIG. 2 is a perspective exploded view of a temperature sensing assembly constructed according to the invention with certain parts illustrated in broken lines.
Figure 9:
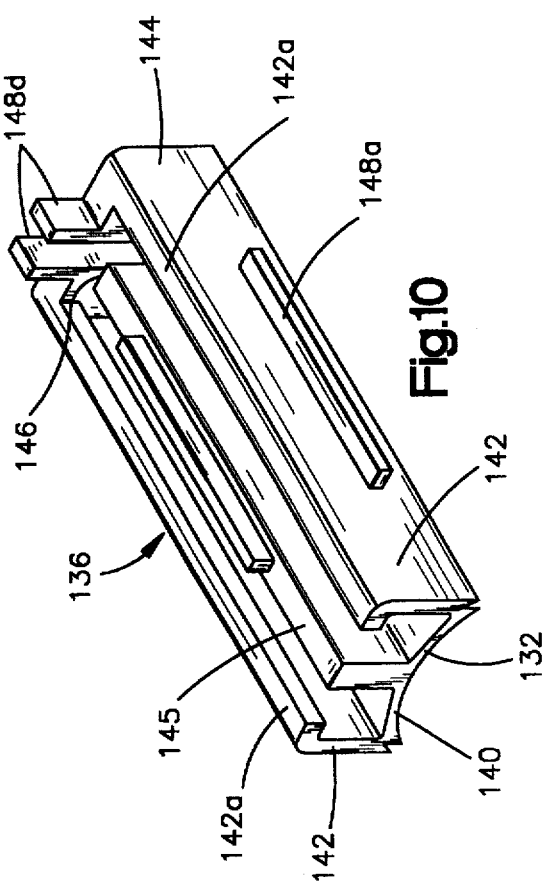
FIG. 9 is a cross sectional view seen approximately from the plane indicated by the line 9—9 of FIG. 7; and, FIG. 10 is a perspective view of a component part of the assembly illustrated in FIG. 7.
Figure 7:
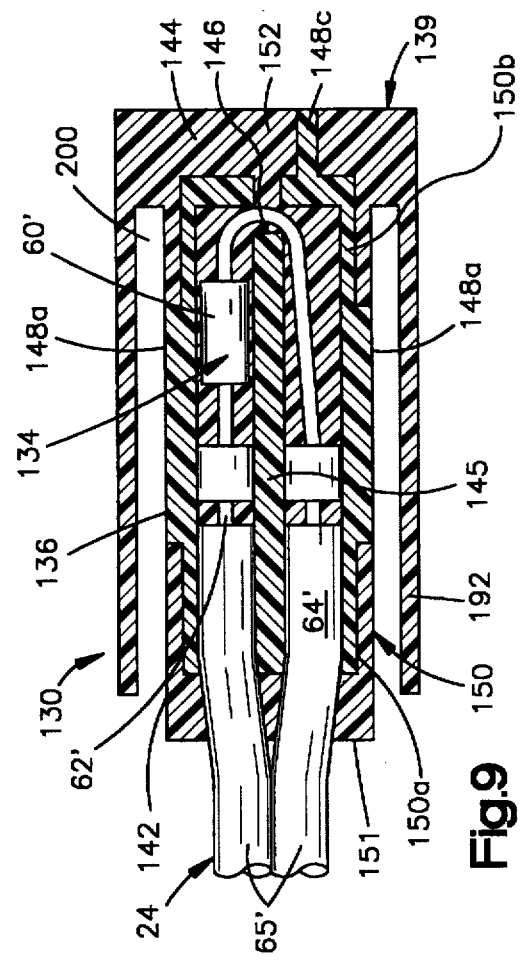
FIG. 7 is a perspective view of another preferred temperature sensor assembly constructed according to the invention.
Figure 10:
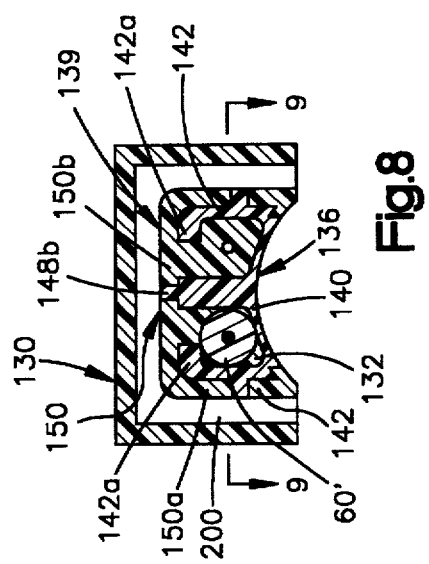
Figure 8:
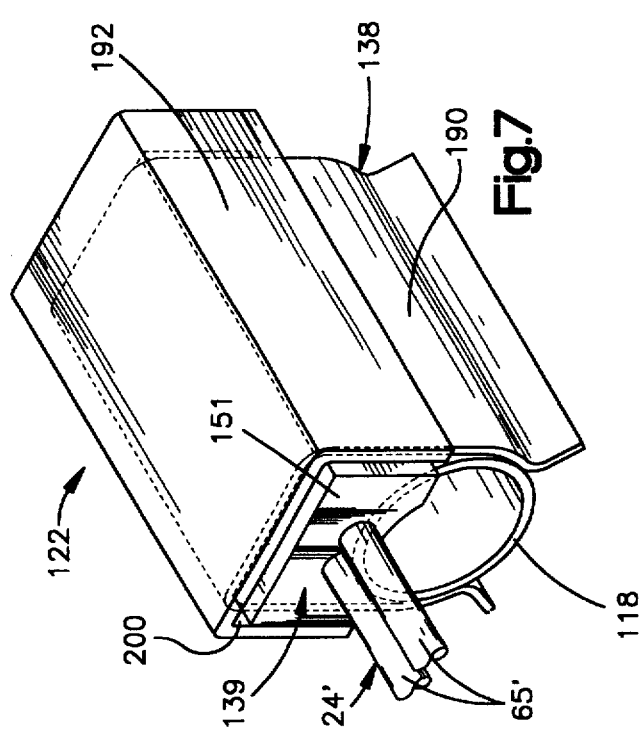
FIG. 8 is a cross sectional view seen approximately from the plane indicated by the line 8—8 of FIG. 7 with parts removed.

FIG. 1 schematically depicts an outdoor heat exchanger installation 10 forming part of a heat pump system for heating and cooling a building. When the building is being heated the heat exchanger installation 10 absorbs heat from atmospheric air and delivers the heat to the building interior. When the building is being cooled, the installation delivers heat from inside the building to the atmospheric air. As shown in FIGS. 2–6, the installation 10 comprises a heat exchanger 11, a housing, or enclosure, 12 surrounding and supporting the heat exchanger 11, and a blower (not illustrated) supported by the housing for forcing atmospheric air flows across the heat exchanger.

The heat exchanger 11 comprises a long refrigerant flow tube 18 which is wound back and forth within the housing. Closely spaced, thermally conductive metal fins (not illustrated) are assembled to the tube to increase the effectiveness of the convective heat transfer between the tube and the atmospheric air. The blower is located in the top center of the housing and forces atmospheric air through the fins and across the flow tube 18 via appropriate vent openings in the housing walls. The heat exchanger, blower and housing may be of any conventional or suitable construction and therefore are not described in detail.

During cold weather the heat pump system operates to heat the building. The installation 10 absorbs heat from the atmospheric air and delivers the heat to the building interior. When the atmospheric air is well below zero degrees C., the temperature differential between the flow tube 18 and the air may be relatively small. In such conditions ice or frost readily forms on the heat exchanger surfaces. This materially reduces the efficiency of the heat exchanger and requires prompt defrosting.

The presence of ice or frost is reliably signalled when the temperature differential between the air and the flow tube surface exceeds a predetermined value for a given outdoor air temperature. As atmospheric air temperature becomes lower and lower the frost or ice indicating temperature differential steadily decreases to just a few degrees. How tube temperature sensing must therefore be extremely accurate for optimum heat pump performance during cold weather.

Defrosting the heat exchanger 11 is preferably controlled in the manner disclosed by U.S. Pat. No. 4,882,908 to White entitled "Demand Defrost Control Method and Apparatus," the disclosure of which is hereby incorporated herein in its entirety by this reference. A control module 20, supported by the housing 12, governs the defrosting operation. The control module 20 is associated with a temperature sensing assembly 22 mounted on the flow tube 18 for signalling the flow tube temperature via a signal cable 24. An atmospheric air temperature sensor, not illustrated, enables monitoring the differential between the flow tube temperature and the atmospheric air temperature.

The temperature sensing assembly 22 comprises a housing 30, a thermally responsive signal producing assembly 34 supported in the housing 30, and mounting structure 38 for connecting the assembly 22 to the flow tube 18. The illustrated housing 30 comprises an anchoring arrangement 36 for positioning and securing the signal producing assembly in place in the housing. The temperature sensing assembly 22 is mounted at a flow tube location which is best determined according to the geometry of the heat exchanger and enclosure as well as the operating characteristics of the blower.

The housing 30 is formed from electrical insulating materials which are relatively poor thermal conductors and comprises a thin walled heat transmitting wall section 40 extending substantially the entire length of the housing, a relatively thick, heat insulating structural support wall section 42 coextending with the wall section 40 and a relatively thick, heat insulating end wall 44. The illustrated housing wall sections 40, 42, and 44 define the walls of a chamber 32 and are formed by a single continuous body of molded polycarbonate thermoplastic material such as G. E. Lexan 500r-7344@ or another suitable alternative.

The wall section 40 defines a film (preferably 0.01 in. thick) extending continuously throughout the length of the chamber and shaped to conform to the peripheral flow tube surface. The illustrated film wall is thus concave and cylindrically curved to conform to the circular flow tube cross sectional shape. Even though the film wall material thermal conductivity is quite low, the large contact area between the flow tube surface and the wall section 40, together with the short conduction path through the wall, enables the wall section 40 to function as an efficient heat conductor.

The housing wall section 42 comprises a base wall portion 50 and laterally spaced side wall portions 52 extending between the base wall portion edges and the film wall section edges. The housing wall section 42 is "U" shaped in cross section. The concavely curved film wall section medial portion 54 projects toward the base wall portion 50 between the side wall portions.

The housing end wall section 44 is preferably thick and imperforate and closes the chamber end opposite to the open housing end.

The signal producing assembly 34 comprises an electrical signal producing element 60 disposed in the chamber 32 in heat transfer relationship with the heat transmitting wall section 40 and first and second conductors 62, 64 extending into the chamber for completing an electric circuit through the element 60. The conductors 62, 64 form part of the signal cable 24 and are uninsulated in the vicinity of the element 60. Each conductor extends to the control module and is shrouded by a resilient plastic insulator 65. The insulators 65 extend slightly into the chamber 32. The preferred signal producing element 60 is a generally cylindrical thermistor with integral wire leads extending from opposite ends for connection to the conductors 62, 64 by suitable splices. The thermistor has a larger diameter (about 0.090 inches) than the leads and the conductors. The thermistor is hermetically sealed by a glass bead-like shield.

The anchoring arrangement 36 locates and fixes the signal producing assembly in place in the chamber. The illustrated anchoring arrangement 36 comprises a septal rib 70 in the chamber 32 for locating the element 60 near the wall section 40 with the conductors 62, 64 separated, a positioner unit 72 securing the assembly in place in the housing 30, and a body 74 encapsulating the assembly 34 when it has been positioned in the chamber.

The septal rib 70 engages and guides the signal producing assembly as it is inserted into the chamber so that the assembly assumes a desired position in the housing. The rib 70 extends longitudinally along the chamber base wall portion 50 and projects toward the wall section medial portion 54 for engagement with the signal producing assembly. The rib projects sufficiently far into the housing so the element 60 is maintained in position along one side wall portion 52 and the conductors and leads are effectively spaced from each other in the chamber to preclude short circuiting the thermistor. One of the leads forms a loop-like projecting end of the signal producing assembly 34 and is guided into close proximity with the wall section 40 by the rib. This interaction assures that the thermistor is likewise positioned in engagement with or immediately adjacent the wall section 40.

The positioner unit 72 secures the signal producing assembly in place in the housing so that tensile forces tending to pull the housing 30 from the cable 24 are not exerted on the signal producing assembly. The unit 72 comprises a positioner member 76 for engaging and positioning the signal producing assembly and a latching mechanism for securing the positioner member in place.

The preferred positioner member 76 has a shaped end projecting into the chamber between the conductors 62, 64 adjacent the open chamber end. The positioner member end comprises outwardly diverging wedging faces 78. The faces 78 wedge the conductors apart and into tight, frictional contact with the chamber side wall portions. In the preferred embodiment the faces 78 engage the conductors where each is jacketed by an insulator. The insulators are compressed slightly against the chamber wall. When force exerted on the cable 24 or the housing 30 tends to pull the housing from the cable, the wedging engagement between the member 76 and the conductors resists housing separation without applying force to the signal producing assembly.

The latching mechanism comprises latching elements formed by faces 80, 82, located respectively on the positioner member 76 and the housing 30, confronting each other when the member 76 wedges the conductors into place to prevent withdrawal of the member 76 from the housing. In the illustrated embodiment the member 76 carries a keeper face 80 at the wide end of each wedging face 78. Each keeper face 80 intersects its associated wedging face 78 at an acute angle with the face 80 extending from the wedging face end to the member 76.

The latching faces 82 are formed on the base wall portion 50. A positioner member receiving slot 84 extends through the base wall portion 50 from the open chamber end toward the rib 70. The slot 84 extends longitudinally relative to the housing 30 along the base wall portion mid-line. The longitudinally extending slot sides 86 diverge from each other proceeding away from the chamber 32 at an included angle which is larger than the included angle of the wedging faces 78. The latching faces 82 extend along the edges of the slot 84 in the chamber.

The positioner member 76 is inserted into the chamber by forcing the wedging faces 78 through the slot 84 with the wedging faces 78 passing between the slot sides 86. The housing wall portions defining the slot sides 86 and the associated latching faces 82 resiliently deflect away from each other as the wedging faces pass between them. When the wedging faces have passed by, the slot sides spring back to their initial positions so that the latching faces 82 confront the keeper faces 80. The positioner member end can not be withdrawn from the chamber.

In the preferred and illustrated embodiment the positioner member 76 is a continuous integral part of the temperature sensing assembly 22. The illustrated positioner member is elongated and has a square or rectangular cross sectional shape. The width of the member 76, except for the wedging faces 78, is less than the width of the slot 84. The member 76 fits easily between the slot sides except when the slot sides are engaged by the wedging faces 78. The member 76 is connected to the housing at the closed end of the slot 84 by a thin flexible hinge strap 88. The member 76, housing 30 and the strap 88 are molded as a single continuous unit. The strap 88 flexes as the positioner end is aligned with and manually pushed through the slot 84 to its latched-in-place location.

The body 74 engulfs, or encapsulates, the signal producing assembly 34 in the housing 30 to aid in fixing the assembly in place as well as to provide a heat transfer path between the film wall section 40 and the thermistor. The material forming the body 74 is an electrical insulator which is preferably a plastic or epoxy inserted into the chamber 2 in a liquid state before the positioner 76 is latched in place. In order to best assure the absence of air bubbles or other discontinuities in the body 74 the material is flowed into the chamber via a suitable cannula. When the chamber 32 is appropriately filled, the positioner 76 is latched in place and the body 74 is cured. In this preferred embodiment of the invention a potting material known as Conap DPEN 8536 is used to form the body 74.

As is best seen in FIG. 6, the positioner member 76 extends to a location immediately adjacent the wall section 40 when latched in place. The wedging faces 78 engage and deform the insulation around the conductors 62, 64 so that the end of the chamber 32 remote from the wall 44 is essentially closed. This prevents loss of liquified potting material from the chamber before the body 74 is cured. Squeezing and deforming the insulating material 65 as described also assures that the conductors are gripped extremely tightly.

The mounting structure 38 not only retains the temperature sensing assembly 22 in place on the flow tube, but also forms a highly conductive heat flow path between the flow tube and the housing 30. The mounting structure heat flow path is shielded to minimize convective heat exchange with the ambient air stream. The preferred structure 38 comprises a resilient retainer member 90 secured to the housing 30 and to the flow tube 18, and an insulating jacket 92 for blocking heat transfer between the retainer member and ambient atmospheric air. The retainer member material is a copper (e.g. Copper C17200, ¼ HT), or copper alloy, spring metal having a high thermal conductivity so that heat from both the ambient air and the housing 30 flows through it to the flow tube 18 when the heat pump is operating to heat the building.

The retainer member 90 has a central body portion 93 attached to the housing 30 and projecting gripping fingers 94 resiliently engaging the flow tube 18. The body portion 93 tightly engages and conforms to the exterior of the heat insulating wall section 42. Thus the body portion 93 and the wall section exterior are in contact over a relatively large, heat conductive surface area. The large area conductive interface between the retainer member 90 and the wall section 42 assures maximal heat flow between them. The wall section temperature tends always to approximate the flow tube temperature because of the heat sink-like character of the retainer member.

The fingers 94 project from the housing 30 to the flow tube 18 and define arcuate sections 96 contiguous with outwardly extending tab-like ends 98. The ends 98 guide the fingers onto the flow tube when the assembly 22 is initially mounted and facilitate spreading the fingers during assembly removal. The resilient arcuate sections 96 confront and closely conform to the flow tube periphery. This maximizes heat flow between the retainer member and the flow tube and minimizes chances for frost or ice buildups between them. The arcuate sections 96 additionally resiliently urge the flow tube into snug contact with the film wall 40.

The insulating jacket 92 minimizes convective heat transfer between the ambient atmospheric air being blown across the heat exchanger 11, the retainer member 90 and housing section 42. In the illustrated embodiment the housing 30 is placketed to provide a retainer member receiving channel 100 between the wall section 42 and the surrounding jacket 92. The preferred jacket 92 is molded continuously with the housing 30 and projects from the end wall 44 parallel to the wall section 42. The jacket 92 is relatively thin walled and defines a base wall portion 102 and depending side wall portions 104 projecting from the portion 102 towards the flow tube 18.

The base wall portion 102 is bifurcated to provide a positioner member accommodating slot 106. The positioner member 76 moves through the slot 106 as it is being latched into position while fabricating the assembly 22. The slot 106 is relatively narrow and oriented so that only relatively weak eddy currents of ambient air, if any at all may be established in the channel 100. These currents are insufficient to produce any significant convective heat transfer with the retainer member parts in the channel so the channel is, for all intents and purposes, a "dead" air space.

The side wall portions 104 extend parallel to the retainer member fingers 94 and terminate adjacent the arcuate finger sections 96. The side wall portions 104 shield the retainer member fingers in the channel 100 from the ambient air. Thus the side wall portions 104 block convective heat transfer between the ambient air and the retainer fingers remote from the flow tube 18. The retainer member fingers adjacent the flow tube are subject to convective heat transfer from ambient air blown across the heat exchanger. The retainer member conductivity is so great and the heat transfer coupling between the fingers 94 and the flow tube 18 is so efficient that the ambient air condition has minimal impact on the temperature of the housing 30.

FIGS. 7–10 illustrate another preferred temperature sensing assembly 122 embodying the invention mounted on a refrigerant flow tube 118. The temperature sensing assembly 122 comprises a housing 130, a thermally responsive signal producing assembly 134 supported in the housing 130, and mounting structure 138 for connecting the assembly 122 to the flow tube 118. The temperature sensing assembly 122 is mounted at a flow tube location which is best determined according to the geometry of the heat exchanger and enclosure as well as the operating characteristics of the blower.

The signal producing assembly 134 is constructed like the assembly 34 described above in reference to FIGS. 1–6. Parts of the assembly 134 which are identical to parts of the assembly 34 are indicated by corresponding primed reference characters in FIGS. 7–9.

The illustrated housing 130 comprises an anchoring arrangement formed by a core-like member 136 for positioning the signal producing assembly 134 in place in the housing 130 and a rigid body 139 of electrical insulating material molded over the core member and the signal producing assembly for encapsulating and securing the signal producing assembly in situ in the core member 136. The housing 130 is thus formed by a composite of the core member 136 and the body 139, both consisting of molded electrical insulating materials which are relatively poor thermal conductors.

The core member 136 comprises a thin, heat transmitting wall section 140 extending substantially the entire length of the core member, relatively thicker, structural support wall sections 142 projecting from opposite lateral sides of, and coextending with, the wall section 140, a relatively thick, end wall 144 extending transversely with respect to the wall sections, and a septal rib 145 projecting from the center of the wall section 140 and extending parallel to the walls 142. The illustrated housing wall sections 140, 142, 144, and the septal rib 145, define a chamber 132 for receiving the signal producing assembly 134. The rib 145 terminates just short of the wall 144 to define a slot 146 through which a thermistor lead extends.

The core member 136 is formed by a single continuous body of molded material which exhibits maximum heat transmissivity consonant with assuring that the signal producing assembly has adequate electrical insulation. The preferred core member is formed from 30% graphite filled 6/6 nylon. The wall section 140 is a film-like element (on the order of 0.01 inches thick) cylindrically curved to conform to the flow tube periphery. Heat conduction through the wall section 140 is facilitated by the very thin section. Heat flow between the flow tube and the thermistor through the wall section 140 is relatively efficient and the core element temperature closely follows the flow tube temperature via conduction through the core member material.

The core member 136 is constructed and arranged so that anchoring structure maintains the thermistor in heat transfer contact with the wall section 140 and one of the wall sections 142. The wall sections 142 each terminate in a lip 142a projecting toward the septal rib. The clearance between the lip 142a and the rib 145 is smaller than the diameter of the thermistor. The wall section 142 and the rib 145 are resiliently deformed by the thermistor as it passes between them during assembly of the signal producing assembly to the core member 136. The wall sections 142 and the rib 145 snap back toward their normal positions after the thermistor passes between them so the thermistor is resiliently anchored between the wall sections 140, 142. This assures good heat transmitting contact between the thermistor and both wall sections.

The core member 136 and signal producing assembly 134, assembled as described, are placed in a mold cavity (not illustrated) and material forming the body 139 is injected into the mold to substantially encapsulate both the core member and the assembly 134. The preferred core member 136 is positioned within the mold cavity by locating projections, generally indicated by the reference character 148, which respectively engage a cavity surface. The projections 148 engage the mold cavity to force the core member 136 to a position where the wall section 140 is firmly engaged with a conforming cylindrical mold cavity surface. Full surface engagement between the wall section 140 and the mold cavity assures that the material forming the body 139 does not cover the outer surface of the wall section 140.

The body 139 comprises a housing section 150 surrounding and encapsulating the core member 136 (except for the exposed cylindrical face of the wall section 140) and the signal producing assembly 134, an end wall 152 adjacent and fixed to the core member end wall section 144, and a heat insulating jacket 192 projecting from the end wall 152 parallel to and spaced from the housing section 150. The body 139 is formed from an injection molded plastic electrical insulating material selected to exhibit a relatively low degree of thermal conductivity. Thus, compared to the core member material, the body 139 is a heat insulator.

The housing section 150 defines walls 150a extending along the core member walls 142, a central section 150b between the walls 150a and an end segment 150d projecting a short distance from the core member end for hermetically sealing the conductors. The core member projections 148 further serve to lock the core member 136 and body 139 together when the body material solidifies.

The locating projections 148a on the wall sections 142 take the form of longitudinally extending lands projecting laterally from the core member. Each projection 148a extends through a respective housing section wall 150a. The combined core member and body walls, 142 and 150a, respectively, form relatively thick, heat insulating structural support wall sections on opposite sides of the heat transmitting wall section 140.

The septal rib projection 148b is a longitudinally extending land projecting through the central section 150b. The material of the central section 150b flows around the septal rib into the core member chamber 132 completely filling the chamber and engulfing the signal producing assembly. The central section 150b forms part of the anchoring structure in that it secures the thermistor in place against the wall section 140 when it has solidified. A central section end 151 projects from the chamber end along the conductors to hermetically seal the entry location of the conductors into the chamber.

The locating projections on the end wall section 144 are formed by a single cylindrical dowel-like longitudinal projection 148c and a pair of laterally extending tangs 148d. The projection 148c extends through the end wall 152 while the tangs 148d project through the jacket 192 at its juncture with the end wall 152.

The jacket 192 and housing section 150 are spaced to define a channel 200 between them. The mounting structure 138 is disposed in the channel. The preferred mounting structure comprises a resilient retainer member 190 having a high heat conductivity and secured to the housing section 150 and to the flow tube 118. The insulating jacket 192 blocks convective heat transfer between the retainer member 190 and ambient atmospheric air. The channel 200 forms an insulating dead air space between the jacket 192 and both the retainer member 190 and the housing section 150. The jacket 192 has a very thin cross section which, together with its low thermal conductivity, minimizes heat flow along the jacket and thus minimizes heat transfer between the jacket and the housing 150 and its contents.

The retainer member is constructed the same as the member 90 referred to above. Accordingly, the retainer member tends to maintain the temperature of the housing section 150 the same as the flow tube temperature. This further insures responsive, accurate temperature related signals from the thermistor.

While preferred embodiments of the invention have been illustrated and described in detail, the present invention is not to be considered limited to the precise constructions disclosed. Various adaptations, modifications and uses of the invention may occur to those skilled in the art to which the invention relates. For example, a temperature sensor embodying the invention may be employed in an environment other than a heat exchanger in a refrigeration system. The intention is to cover hereby all such adaptations, modifications and uses which fall within the spirit or scope of the appended claims.

We claim:

1. A temperature sensing assembly for determining the temperature of an object in a fluent medium comprising:

a. a thermally responsive signal producing assembly comprising an electric signal producing element for producing signals whose values depend on the temperature of said signal producing element, and first and second conductors for completing an electric circuit through the element;

b. an elongated sensor housing supporting said electric signal producing element, said housing constructed from electrically insulative material and comprising a thin heat transmitting wall section in heat transfer engagement with said electrical signal producing element and a body for fixing said electric signal producing element in place with respect to said heat transmitting wall section;

c. an insulating jacket coextending with said sensor housing and spaced from said housing to define a channel therebetween;

d. said thin heat transmitting wall section being formed by part of a core member in which said signal producing assembly is supported and said body being formed by a material molded in place over said core member; and, e. said jacket being continuous with said body and formed by said molded material.

2. A temperature sensing assembly for determining the temperature of an object in a fluent medium comprising:

a. a thermally responsive signal producing assembly comprising an electric signal producing element for producing signals whose values depend on the temperature of said signal producing element, and first and second conductors for completing an electric circuit through the element;

b. an elongated sensor housing supporting said electric signal producing element, said housing constructed from electrically insulative material and comprising a thin heat transmitting wall section in heat transfer engagement with said electrical signal producing element and a body for fixing said electric signal producing element in place with respect to said heat transmitting wall section; and, c. an insulating jacket coextending with said sensor housing and spaced from said housing to define a channel therebetween;

d. said thin heat transmitting wall section being formed by part of a core member in which said signal producing assembly is supported and said body being formed by a material molded in place over said core member;

e. said core member comprising a support wall section resiliently urging part of said signal producing element against said heat transmitting wall section.

3. A temperature sensing assembly for determining the temperature of an object in a fluent medium comprising:

a. a thermally responsive signal producing assembly comprising an electric signal producing element for producing signals whose values depend on the temperature of said signal producing element, and first and second conductors for completing an electric circuit through the element;

b. an elongated sensor housing supporting said electric signal producing element, said housing constructed from electrically insulative material and comprising a thin heat transmitting wall section in heat transfer engagement with said electrical signal producing element and a body for fixing said electric signal producing element in place with respect to said heat transmitting wall section;

c. an insulating jacket coextending with said sensor housing and spaced from said housing to define a channel therebetween; and, d. said thin heat transmitting wall section being formed by part of a core member in which said signal producing assembly is supported and said body being formed by a material molded in place over said core member;

e. said core member comprising projections extending therefrom into said molded body material to secure said body and core member together.

4. A temperature sensing assembly for determining the temperature of a member in an ambient fluent medium comprising:

a. a housing comprising a thin heat transmitting wall section engaged with said member and a relatively thick, heat insulating structural support wall section;

b. a thermally responsive signal producing assembly comprising an electric signal producing element disposed in heat transfer relationship with said heat transmitting wall section, said signal element producing signals whose values depend on the temperature of said element, and first and second conductors for completing an electric circuit through the element;

c. anchoring structure for fixing the signal producing assembly in place with respect to said housing, said anchoring structure maintaining said signal producing element in heat exchange relationship with said heat transmitting wall section; and, d. heat transfer structure in heat transfer relationship between said housing and said member, said heat transfer structure tending to maintain the member and heat insulating wall section temperatures the same;

e. said housing being formed by a core member supporting said signal producing assembly and a separate body molded over said core member;

f. said core member defining said heat transmitting wall section and part of said heat insulating wall section, said heat insulating wall section resiliently anchoring said signal producing element in said core member.

5. A temperature sensing assembly for determining the temperature of an object in a fluent medium comprising:

a. a thermally responsive signal producing assembly comprising an electric signal producing signals whose values depend on the temperature of said signal producing element, and first and second conductors for completing an electric circuit through the element;

b. an elongated sensor housing supporting said electric signal producing element, said housing constructed from a core member formed of electric and thermal insulating material and comprising a heat transmitting wall section formed by a film of said material and a relatively thick heat insulting wall of said material associated with said heat transmitting wall section to form a cavity in which said signal producing assembly is disposed, and an electrical insulating body formed by a material molded in place over said core member, said body enveloping said electrical signal producing element and conforming to said cavity for fixing said electric signal producing element in heat transfer relationship with said heat transmitting wall section; and, c. an insulating jacket coextending with said sensor housing and spaced from said housing to define a channel therebetween.

6. The assembly claimed in 5 wherein said jacket is continuous with said body and formed by said molded material.

7. The assembly claimed in claim 5 wherein said core member comprises a support wall section resiliently urging part of said signal producing element against said heat transmitting wall section.

8. The assembly claimed in claim 5 wherein said core member further comprises projections extending therefrom into said molded body material to secure said body and core member together.

9. A temperature sensing assembly for determining the temperature of a member in an ambient fluent medium comprising:

a. a housing comprising a core formed of an electrical and thermal insulating material comprising a film-like heat transmitting wall section engaged with said member and a relatively thick, heat insulating structural support wall section associated with said heat transmitting wall section and forming a cavity;

b. a thermally responsive signal producing assembly comprising an electrical signal producing element disposed in said cavity in heat transfer relationship with said heat transmitting wall section, said signal element producing signals whose values depend on the temperature of said signal element, and first and second electrical conductors for completing an electric circuit through the element;

c. anchoring structure for fixing the signal producing assembly in place with respect to said housing, said anchoring structure comprising an electrical insulating body encapsulating said signal producing element, said body molded over said core with said core and body locked together so that said signal producing element is fixed in said cavity for maintaining said signal producing element in heat exchange relationship with said heat transmitting wall section; and, d. heat transfer structure in heat transfer relationship between said housing and said member, said heat transfer structure tending to maintain the member and heat insulating wall section temperatures the same.

* * * * *